United States Patent
Fujimoto

(10) Patent No.: US 9,392,182 B2
(45) Date of Patent: Jul. 12, 2016

(54) RAW DATA PROCESSING APPARATUS, RAW DATA PROCESSING METHOD AND IMAGING DEVICE

(71) Applicant: Sony Corporation, Tokyo (JP)

(72) Inventor: Masakatsu Fujimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 219 days.

(21) Appl. No.: 13/965,735

(22) Filed: Aug. 13, 2013

(65) Prior Publication Data

US 2014/0055639 A1 Feb. 27, 2014

(30) Foreign Application Priority Data

Aug. 24, 2012 (JP) ................................ 2012-185087

(51) Int. Cl.
*H04N 5/235* (2006.01)
*H04N 5/217* (2011.01)
*H04N 5/232* (2006.01)

(52) U.S. Cl.
CPC ........... *H04N 5/2353* (2013.01); *H04N 5/2355* (2013.01); *H04N 5/217* (2013.01); *H04N 5/23232* (2013.01)

(58) Field of Classification Search
CPC .... H04N 5/2352; H04N 5/2353; H04N 5/217
USPC ..................................................... 348/229.1
See application file for complete search history.

(56) References Cited

U.S. PATENT DOCUMENTS

| 2009/0185058 A1* | 7/2009 | Vakrat et al. ................... 348/241 |
| 2009/0290042 A1* | 11/2009 | Shiohara ..................... 348/222.1 |
| 2011/0102647 A1* | 5/2011 | Kim ....................... H04N 5/361 348/243 |
| 2011/0228143 A1* | 9/2011 | Makino .............. G01N 21/6456 348/243 |
| 2012/0086830 A1* | 4/2012 | Ichikawa et al. ........... 348/223.1 |

FOREIGN PATENT DOCUMENTS

JP 2010-124412 6/2010

* cited by examiner

*Primary Examiner* — Roberto Velez
*Assistant Examiner* — Cynthia Segura
(74) *Attorney, Agent, or Firm* — Dentons US LLP

(57) ABSTRACT

Provided is a raw data processing apparatus including a variable processing part that processes raw data with a predetermined variable value, the raw data being output from an imaging element, an exposure determination part that receives the raw data and determines a gain value of the imaging element based on a determination result obtained by determining an exposure which is set when the raw data is shot, an improvement amount table in which an improvement amount for the gain value of the imaging element is set, a gain modulation part that extracts the improvement amount from the improvement amount table and modulates the gain value of the imaging element, a development parameter setting part that sets a development parameter used for developing the raw data, and a development processing part that outputs image data which is developed from the raw data processed with a predetermined variable value.

6 Claims, 4 Drawing Sheets

| | | S/N IMPROVEMENT AMOUNT[dB] | | | |
|---|---|---|---|---|---|
| | | SENSOR GAIN VALUE | | | |
| | | 6dB | ... | 30dB | 36dB |
| NUMBER OF COMBINED PIECES | ONE PIECE | 0dB | ... | 0dB | 0dB |
| | TWO PIECES | 6dB | ... | 7dB | 8dB |
| | ... | ... | ... | ... | ... |
| | 62 PIECES | – | ... | – | 32dB |
| | 63 PIECES | – | ... | – | 35dB |
| | 64 PIECES | – | ... | – | 36dB |

| | | S/N IMPROVEMENT AMOUNT[dB] | | |
|---|---|---|---|---|
| | | SENSOR GAIN VALUE | | |
| | | 6dB | ... | 30dB | 36dB |
| RESIZING RATIO | 90% | 0dB | ... | 0dB | 0dB |
| | 85% | 6dB | ... | 7dB | 8dB |
| | ... | ... | ... | ... | ... |
| | 35% | − | ... | − | 32dB |
| | 30% | − | ... | − | 35dB |
| | 20% | − | ... | − | 36dB |

S/N IMPROVEMENT AMOUNT [dB]

| | | SENSOR GAIN VALUE | | | |
|---|---|---|---|---|---|
| | | 6dB | ... | 30dB | 36dB |
| THREE-DIMEN-SIONAL NOISE REDUC-TION INTENSITY | 90% | 0dB | ... | 0dB | 0dB |
| | 85% | 6dB | ... | 7dB | 8dB |
| | ... | ... | ... | ... | ... |
| | 35% | – | ... | – | 32dB |
| | 30% | – | ... | – | 35dB |
| | 20% | – | ... | – | 36dB |

RAW DATA PROCESSING APPARATUS, RAW DATA PROCESSING METHOD AND IMAGING DEVICE

BACKGROUND

The present disclosure relates to a raw data processing apparatus for processing raw data, a raw data processing method and an imaging device, for example.

In the past, a method has been known in which a plurality of frames are shot and the taken frame data (hereinafter, referred to as "raw data") is combined for each plurality of frames to improve an S/N of the raw data or to obtain a wide dynamic range. This method can be used to acquire an image with good S/N and an image having a wide dynamic range each of which is difficult to obtain by shooting only one still image. A state of the combined raw data varies depending on a sensor gain value set for an image sensor and a processing method applied to the raw data.

Then, optimum development parameters are set for the combined raw data to develop the raw data into a still image data such as a JPEG (Joint Photographic Experts Group). This process may require the optimum development parameters to be held for each state of a variety of raw data, which leads to a large amount of a storage area of a memory for storing the development parameters.

However, the memory installed in a hardware is limited in a size of the storage area to be allocated for the development parameters. For this reason, the variety of states of the combined raw data is narrowed down by limiting the processing method of the raw data to certain functions thereof and so on to narrow the number of necessary development parameters down.

Here, Japanese Patent Laid-Open No. 2010-124412 has disclosed a technology for combining two pieces of raw data different in an ISO (International Organization for Standardization) sensitivity. By use of this technology, the development parameters for the combined raw data may be set in a case of generating an image having the wide dynamic range.

SUMMARY

In a case of employing the method disclosed in Japanese Patent Laid-Open No. 2010-124412, a blend ratio of the original raw data for two raw images is referred to and low ISO sensitivity parameters and high ISO sensitivity parameters of the still image are blended to obtain the development parameters. However, when a large amount of raw data more than two pieces is combined, the optimum development parameters may not be obtained only by collecting blend ratio information. For this reason, it is difficult to set the appropriate development parameters for the raw data obtained by combining a large amount of raw data, which sometimes leads to disabling the development.

The present disclosure is made in view of such circumstances, and it is desirable to obtain the optimum development parameters for developing the raw data.

According to an embodiment of the present disclosure, raw data is processed with a predetermined variable value, the raw data being output from an imaging element on the basis of image light incident via an optical system.

Next, the raw data is received from the imaging element to determine a gain value of the imaging element on the basis of a determination result obtained by determining an exposure which is set when the raw data is shot.

Subsequently, an improvement amount is extracted from an improvement amount table in which the improvement amount for the gain value of the imaging element is set on the basis of information of the raw data processed with a predetermined variable value and the determined gain value of the imaging element, and the gain value of the imaging element is modulated.

Then, a development parameter used for developing the raw data is set on the basis of the modulated gain value of the imaging element, and the raw data is subjected to a predetermined process on the basis of the development parameter to output image data.

This allows to set the development parameter using the modulated gain value of the imaging element and develop the raw data.

According to the embodiments of the present disclosure described above, a lot of combinations of the development parameters for the gain value of the imaging element may not be set in setting the development parameter. Additionally, setting the improvement amount in the improvement amount table allows to modulate the gain value of the imaging element, obtain the optimum development parameter, and appropriately develop the raw data.

DETAILED DESCRIPTION OF THE EMBODIMENT(S)

Embodiments for carrying out the present disclosure (hereinafter, referred to as the embodiment(s)) will be described below. Description is given in the following order, and the same symbols are attached to the same elements and the overlapping explanation is omitted.

1. Explanation of Premise
2. First embodiment (example in which a sensor gain value is modulated depending on the number of combined pieces of raw data)

3. Second embodiment (example in which a sensor gain value is modulated depending on a resizing ratio of a raw image)

4. Third embodiment (example in which a sensor gain value is modulated depending on a three-dimensional noise reduction intensity)

5. Modified embodiment

<1. Explanation of Premise>

The present inventors firstly studied as follows.

Figure 7:
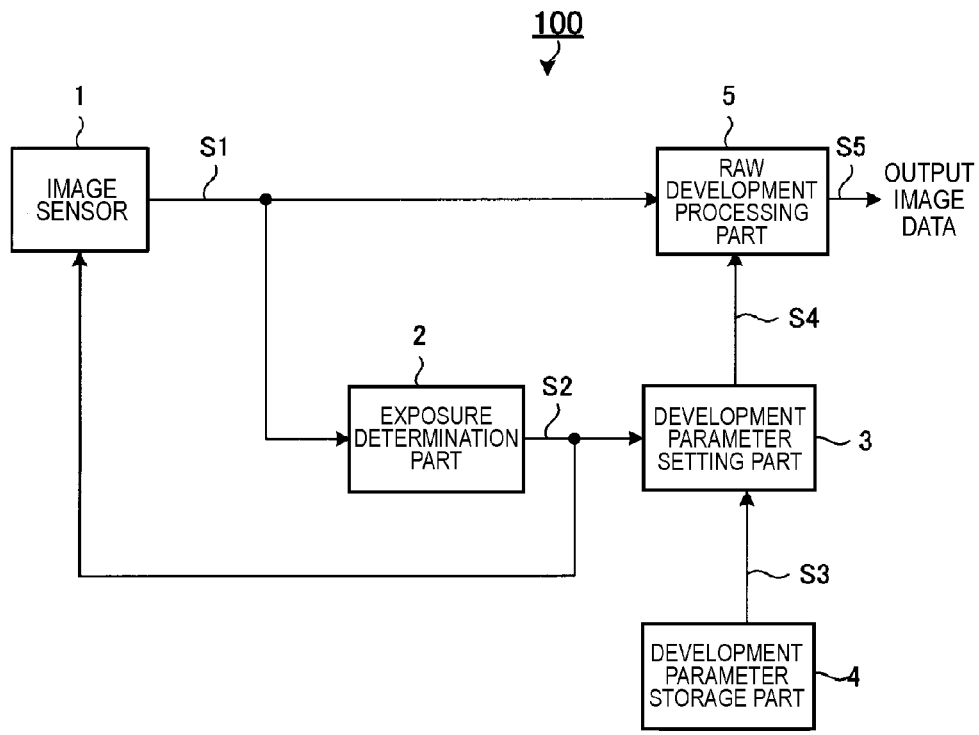
FIG. 7 is a block diagram showing an internal structure example of an imaging device.

FIG. 7 is a block diagram showing an internal structure example of an imaging device 100.

The imaging device 100 includes an image sensor 1, an exposure determination part 2, a development parameter setting part 3, a development parameter storage part 4, and a raw development processing part 5. The imaging device 100 carries out a process for developing a still image using a method of related art.

The image sensor 1 is constituted by an imaging element such as a CCD (charge coupled device) or a CMOS (complementary metal oxide semiconductor) sensor. When image light incident via an optical system not shown is imaged on the image sensor 1, the image sensor 1 generates raw data S1. The raw data S1 is output from the image sensor 1 and input to the exposure determination part 2 and the raw development processing part 5.

The exposure determination part 2 determines an exposure of the image sensor 1 on the basis of a data value extracted from the raw data S1 and subjects, based on a determination result, the image sensor 1 to an adequate adjustment of the exposure amount. At this time, the exposure determination part 2 determines a sensor gain value S2 of the image sensor 1 from a shutter speed of a shutter action performed by the optical system not shown, an f-number and the like. Then, the exposure determination part 2 outputs the determined sensor gain value S2 to the image sensor 1 to adjust a gain value of image sensor 1, and thereafter, the image sensor 1 performs shooting. The sensor gain value S2 is a value which is found by the exposure determination part 2 depending on an amount of a level of the raw data S1 obtained by analysis, and used for adjusting the sensor gain, f-number and shutter time of the image sensor 1. Here, the raw data S1 itself does not include ISO sensitivity information. However, when implementing the same process as the exposure determination part 2 by use of a software, the ISO sensitivity and gain information of an AGC included in a header of a raw data file may be referred to determine the sensor gain value S2.

The raw data S1 output from the image sensor 1 in the shooting process is input to the raw development processing part 5. The raw development processing part 5 performs a development process on the basis of the input raw data S1. A development parameter S4 necessary for the development process is supplied from the development parameter setting part 3. The development parameter setting part 3 determines the optimum development parameter derived from the sensor gain value S2 from among various development parameters which are stored in the development parameter storage part 4, and supplies the determined development parameter as the development parameter S4 to the raw development processing part 5. The raw development processing part 5 develops the raw data S1 on the basis of the development parameter S4 to be output as image data S5 such as JPEG.

Figure 8:
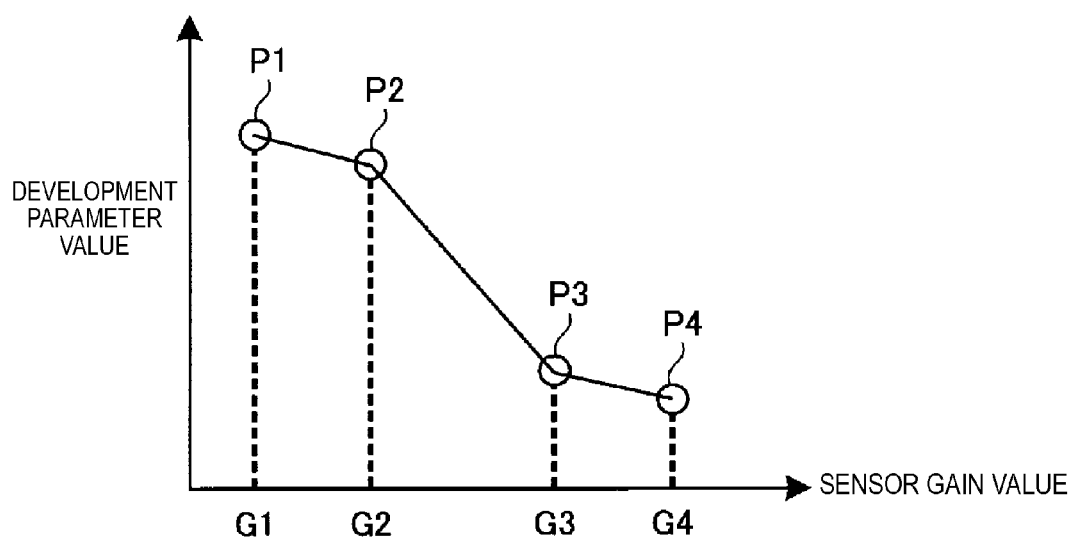
FIG. 8 is an illustration showing an example of a determination process of a development parameter value.

FIG. 8 is an illustration showing an example of a determination process of a development parameter value determined by the development parameter setting part 3.

Sensor gain values G1 to G4 shown in FIG. 8 show specific values of the sensor gain value S2 shown in FIG. 7. The development parameter setting part 3 generally determines the development parameter S4 using a relation between the sensor gain value and the development parameter value shown in FIG. 8.

The sensor gain values S2 are defined at small intervals. For example, if a range from 6 dB to 24 dB is defined as a variable range of the sensor gain value S2, the minimum variable amount of the sensor gain value S2 may be defined in a unit of 0.3 dB. In this case, 61 values of the sensor gain value S2 may be defined.

However, if the optimum development parameter is held for each of 61 values of the sensor gain value S2, a storage area of the development parameter storage part 4 has to be extended. For this reason, generally, development parameter values P1 to P4 are found in advance to correspond to several sensor gain values G1 to G4 which are defined at some intervals. Then, a correspondence relation between the sensor gain values G1 to G4 and the development parameter values P1 to P4 are held in the development parameter storage part 4. The development parameter values P1 to P4 are appropriately read out by the development parameter setting part 3.

For example, in a case where the ISO sensitivity is "100", the development parameter value P1 corresponding to the sensor gain value G1 is set to "1.0" in order to increase the S/N of the raw data. In a case where the ISO sensitivity is set higher than "100", the development parameter value P4 corresponding to the sensor gain value G4 is set to "0.2" because of the sufficiently increased S/N of the raw data.

For example, assuming that the sensor gain value S2 used in shooting falls within the sensor gain values G1 to G2. At this time, the development parameter setting part 3 uses the development parameter values P1 and P2 and the sensor gain values G1 and G2 to interpolate the development parameter value to be set, and sets the development parameter S4 in the raw development processing part 5. The interpolation by the development parameter setting part 3 includes various methods and an operation by linear interpolation which has a simple arithmetic processing is employed in many cases.

The raw development processing part 5, when developing a still image from the raw data S1, switches the development parameter S4 between the case where the sensor gain value S2 is small and the case where the sensor gain value S2 is large. In a case where the sensor gain value S2 is small, a noise reduction intensity is decreased to perform the development with high sharpening of a sharpness or the like because the S/N of the raw data S1 is good. On the other hand, in a case where the sensor gain value S2 is large, the noise reduction intensity is increased to perform the development with low sharpening of the sharpness or the like because the S/N of the raw data S1 is not good.

Here, if, for example, the development parameter S4 adjusted when the sensor gain value S2 is high is applied to the raw data S1 shot with the large sensor gain value S2 while the development parameter S4 is not switched, the noise reduction is high and the sharpening is low. Therefore, the image data S5 having a low resolution is output.

In the process of combining plurality of pieces of raw data, the larger the number of combined pieces, the more effectively the S/N of the raw data is improved. It is known theoretically that when the number of combined pieces is $2^N$, the S/N improvement amount is improved by 6*N [dB]. For example, when eight pieces ($2^3$ pieces) of raw data shot with 24 [dB] are combined, the S/N is improved logically by 6*3=18 [dB], which is substantially the same as the S/N of the raw data shot with 24 dB−18 dB=6 [dB].

However, when the raw data having the S/N improved substantially to 6 [dB] is developed with the optimum development parameter having the sensor gain value of 24 [dB], a resultant image has a low resolution. For this reason, the optimum development parameter for the combined raw data is preferably prepared. However, if the number of combined pieces is increased, the number of combinations of the sensor gain value S2 and the combined pieces number is tremendously increased. It is impractical to hold the optimum development parameter for each of these combinations.

The present inventors have found that, from the above study, structures and processes of an imaging device 10 and a raw data processing apparatus 11 according to a first embodiment of the present disclosure. Hereinafter, a description will be given of how the plurality of pieces of raw data are combined, the S/N of combined raw data S12 is increased, the development parameter S4 is set, and the image data S5 is developed.

<2. First Embodiment>
[Example in which a Sensor Gain Value is Modulated Depending on the Number of Combined Pieces of Raw Data]

Next, a structure example and operation example of the imaging device 10 according to a first embodiment of the present disclosure are described with reference to FIG. 1 and FIG. 2.

Figures 1, 2:
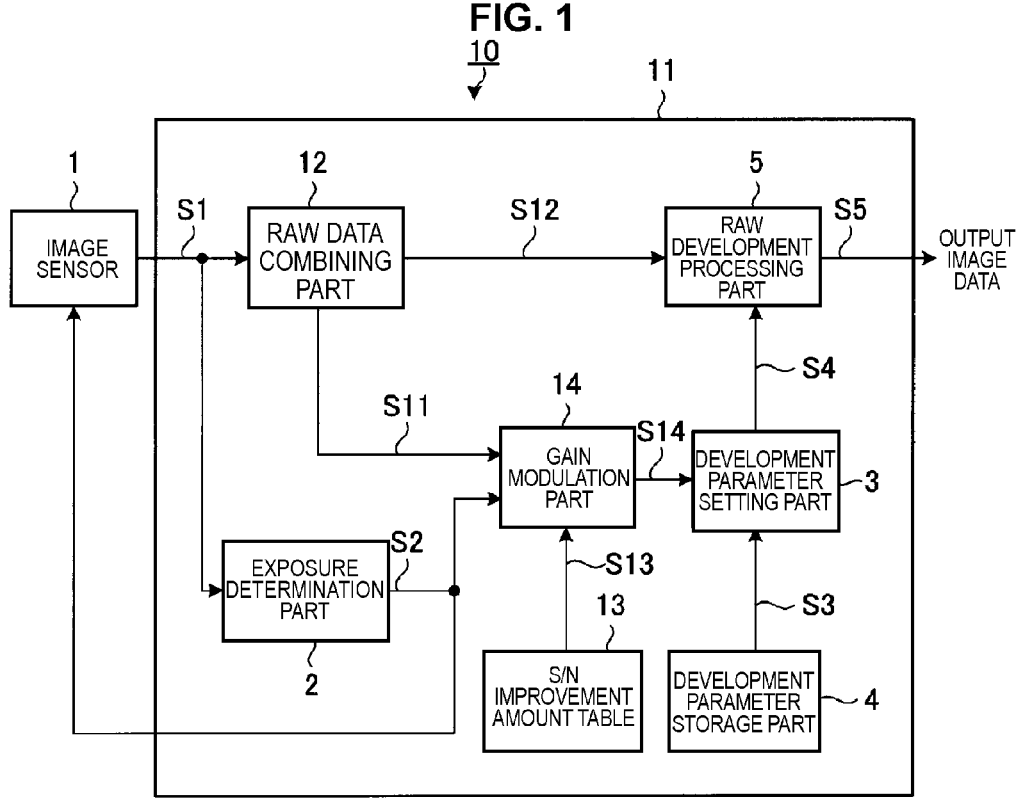
FIG. 1 is a block diagram showing an internal structure example of an imaging device according to a first embodiment of the present disclosure.
FIG. 2 is an illustration showing a structure example of an S/N improvement amount table for defining an S/N improvement amount on the basis of the number of combined pieces and a sensor gain value according to the first embodiment of the present disclosure.

FIG. 1 shows an internal structure example of the imaging device 10 according to the first embodiment.

This imaging device 10 implements a raw data processing method which is performed by a computer to run a program in cooperation with internal blocks described later.

The imaging device 10 according to the first embodiment includes the image sensor 1 and the raw data processing apparatus 11. The raw data processing apparatus 11 includes processing blocks below besides the exposure determination part 2, development parameter setting part 3, development parameter storage part 4, and raw development processing part 5 which are included in the imaging device 100. That is, the raw data processing apparatus 11 includes a raw data combining part 12, an S/N improvement amount table 13, and a gain modulation part 14.

The imaging device 10 combines the plurality of pieces of raw data S1 received from the image sensor 1 and generates the combined raw data S12 having the S/N improved. Then, the imaging device 10 develops the combined raw data S12 to generate the image data S5 and output the image data to a later stage processing block. A detailed processing example of the imaging device 10 is described below.

First, the exposure determination part 2, similarly to the still image shooting by the imaging device 100, adjusts the exposure amount based on the raw data S1 output from the image sensor 1 to determine the sensor gain value S2. Subsequently, the sensor gain value S2 is set in the image sensor 1. After starting of shooting, plurality of pieces (frames) of raw data are output from the image sensor 1 to the exposure determination part 2 and the raw data combining part 12. The number of shot pieces of raw data is determined in advance by a CPU and the like.

The raw data combining part 12 is used as an example of a variable processing part which processes the raw data with a predetermined variable value. The raw data combining part 12 combines the plurality of pieces of raw data input sequentially from the image sensor 1 to output one piece of combined raw data S12.

The development parameter S4 applied to development of the raw data by the raw development processing part 5 is supplied from the development parameter setting part 3 similarly to the general raw development process. Here, the development parameter setting part 3 does not directly refer to the sensor gain value S2 output from the exposure determination part 2 but refers to a sensor gain value S14 modulated by the gain modulation part 14. Then, the gain modulation part 14 extracts an S/N improvement amount S13 for the sensor gain value S2 from the S/N improvement amount table 13 to modulate the sensor gain value S2.

Therefore, the raw data processing apparatus 11 creates in advance the S/N improvement amount table 13 which indicates how much dB the S/N is improved by in a case where a certain sensor gain value S2 is used to combine certain pieces of raw data S1. Then, the sensor gain value S14 is obtained by modulation in which the S/N improvement amount S13 extracted from the S/N improvement amount table 13 is subtracted from the sensor gain value S2. The development parameter setting part 3 interpolates, based on the basis of the modulated sensor gain value S14, the development parameter set for a still image from the development parameter storage part 4 to find the development parameter S4. By way of the process like this, the raw development processing part 5 uses the development parameter S4 for the still image to develop the combined raw data S12 and output the image data S5 having the optimum S/N.

FIG. 2 an illustration showing a structure example of the S/N improvement amount table 13 for defining the S/N improvement amount S13 on the basis of the number of combined pieces S11 and the sensor gain value S2.

The S/N improvement amount table 13 includes an axis classified in accordance with the sensor gain value S2 of the image sensor 1 and an axis classified in accordance with the number of combined pieces of raw data S1, and has the S/N improvement amount S13 provided as a table value in each intersection of the axes in advance by the CPU and the like. Then, the S/N improvement amount S13 is extracted using both the number of combined pieces S11 of the raw data and the sensor gain value S2 in the S/N improvement amount table 13.

As described above, the number of combined pieces S11 output from the raw data combining part 12 and the sensor gain value S2 output from the exposure determination part 2 are input to the gain modulation part 14. The gain modulation part 14 refers to the S/N improvement amount table 13 using these two values to extract the S/N improvement amount S13.

The gain modulation part 14 modulates the sensor gain value S2 of the image sensor 1 by use of the S/N improvement amount S13 extracted from the S/N improvement amount table 13 on the basis of the number of combined pieces of raw data and the gain value of the image sensor 1. Then, the gain modulation part 14 outputs the modulated sensor gain value S14 to the development parameter setting part 3. As a method for improving the S/N by modulating the sensor gain value S2, for example, in a case where the sensor gain value S2 of "dB" is given, a subtraction value is set as an improvement amount in the S/N improvement amount table 13. After the gain modulation part 14 extracts the S/N improvement amount S13 from the S/N improvement amount table 13, the S/N improvement amount S13 is subtracted from the sensor gain value S2 to output the sensor gain value S14, achieving the improvement.

For example, assuming that the sensor gain value S2 is "36 dB" and the number of combined pieces S11 is "two". In this case, the gain modulation part 14 extracts "8 dB" as the S/N improvement amount S13 from the S/N improvement amount table 13. Then, the gain modulation part 14 outputs to the development parameter setting part 3 the sensor gain value S14 "28 dB" which is obtained by subtracting the S/N improvement amount S13 from the sensor gain value S2.

The development parameter setting part 3 uses the modulated sensor gain value S14 to output the development parameter S4 obtained by interpolating from the development parameter storage part 4 similarly to the general raw development process. For example, in a graph shown in FIG. 8, assuming that the sensor gain value G1=6 dB and the sensor gain value G4=36 dB. In this case, a certain sensor gain value S14 of "28 dB" falls within the sensor gain values G3 to G4. For this reason, the development parameter setting part 3 can find the development parameter S4 obtained by linearly interpolating the development parameters P3 to P4. Next, the development parameter setting part 3 sets the development parameter S4 in the raw development processing part 5.

The gain modulation part 14 described above according to the first embodiment extracts the S/N improvement amount S13 on the basis of the sensor gain value S2 and the number of combined pieces S11. Subsequently, the gain modulation part 14 outputs the sensor gain value S14 obtained by improving the sensor gain value S2 using the S/N improvement amount S13 to the development parameter setting part 3. Here, the S/N improvement amount table 13 defines in advance the S/N improvement amount S13 as the table value found from the number of combined pieces S11 and the sensor gain value S2. The gain modulation part 14 may quickly extract the S/N improvement amount S13 to modulate the sensor gain value S2 into the sensor gain value S14. Therefore, even if there are various combinations of the number of combined pieces S11 and the sensor gain value S2, the optimum S/N improvement amount S13 can be extracted to improve the sensor gain value S2. Additionally, the optimum development parameter S4 is set from the modulated sensor gain value S14 on the basis of the development parameter S3 read out the development parameter storage part 4. For this reason, the raw development processing part 5 can carry out the optimum development of the combined raw data S12.

In addition, in a multi-plane blending in which a still image is combined every plurality of pieces to obtain a good S/N, an S/N state of the combined raw data S12 varies depending on the ISO sensitivity and number of combined pieces of the input raw data S1. However, even if the number of the S/N improvement amount S13 set in the S/N improvement amount table 13 is small, the optimum development parameter S4 can be set to the combined raw data S12 having the various S/N states.

<3. Second Embodiment>
[Example in which a Sensor Gain Value is Modulated Depending on a Resizing Ratio of a Raw Data]

Next, a structure example and operation example of an imaging device 20 according to a second embodiment of the present disclosure are described with reference to FIG. 3 and FIG. 4.

Figures 3, 4:
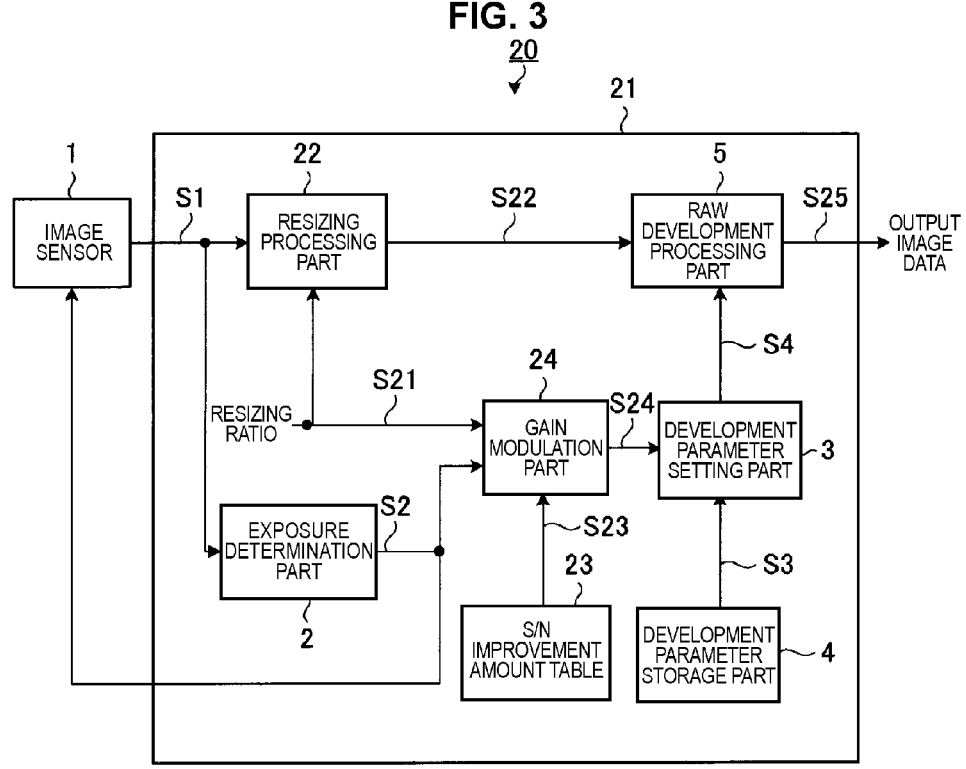
FIG. 3 is a block diagram showing an internal structure example of an imaging device according to a second embodiment of the present disclosure.
FIG. 4 is an illustration showing a structure example of an S/N improvement amount table for defining an S/N improvement amount on the basis of a resizing ratio and a sensor gain value according to the second embodiment of the present disclosure.

FIG. 3 shows an internal structure example of the imaging device 20 according to the second embodiment.

The imaging device 20 according to the second embodiment includes the image sensor 1 and a raw data processing apparatus 21. The raw data processing apparatus 21 includes processing blocks below besides the exposure determination part 2, development parameter setting part 3, development parameter storage part 4, and raw development processing part 5 which are included in the imaging device 100. That is, the raw data processing apparatus 21 includes a resizing processing part 22, an S/N improvement amount table 23, and a gain modulation part 24.

The raw data processing apparatus 21 subjects the raw data output from the image sensor 1 to resizing of an image size of the raw data, that is, an expansion or reduction process in the resizing processing part 22. The expansion or reduction process is performed when, for example, a shot image is displayed on a display part such as a viewfinder not shown and the like. For example, when a display resolution of the display part is lower compared with an imaging resolution of the image sensor 1, the raw data undergoes the reduction process. This process makes it possible to display the entire raw image in the display part. The expansion process, in contrast to the reduction process, converts the raw data into a raw data to have a resolution higher than the imaging resolution of the image sensor 1. The resizing processing part 22 and the gain modulation part 24 are supplied with a resizing ratio S21 by the CPU not shown.

The resizing processing part 22 is used as an example of a variable processing part which processes the raw data with a predetermined variable value. The resizing processing part 22 outputs raw data S22 having an image resized to the raw development processing part 5. The raw development processing part 5 develops the raw data S22 to generate image data S25 which is a still or moving image data and outputs the image data to a later stage processing block.

The development parameter S4 applied to the raw data S22 by the raw development processing part 5 is supplied from the development parameter setting part 3 similarly to the general raw development process. The development parameter setting part 3 refers to a sensor gain value S24 modulated by the gain modulation part 24. The gain modulation part 24 extracts an S/N improvement amount S23 for the sensor gain value S2 from the S/N improvement amount table 23 and finds the sensor gain value S24 by subtracting the S/N improvement amount S23 from the sensor gain value S2.

FIG. 4 is an illustration showing a structure example of the S/N improvement amount table 23 for defining the S/N improvement amount S23 on the basis of the resizing ratio S21 and the sensor gain value S2.

The S/N improvement amount table 23 includes an axis classified in accordance with the sensor gain value S2 of the image sensor 1 and an axis classified in accordance with the resizing ratio S21, and has the S/N improvement amount S23 provided as a table value in each intersection of the axes in advance by the CPU and the like. Then, the S/N improvement amount S23 is extracted using both the resizing ratio S21 of the raw data and the sensor gain value S2 in the S/N improvement amount table 23.

As described above, the resizing ratio S21 and the sensor gain value S2 output from the exposure determination part 2 are input to the gain modulation part 24. The gain modulation part 24 refers to the S/N improvement amount table 23 using these two values to extract the S/N improvement amount S23.

The gain modulation part 24 modulates the sensor gain value S2 by use of the S/N improvement amount S23 extracted from the S/N improvement amount table 23 on the basis of the resizing ratio S21 and the sensor gain value S2 of the image sensor 1. At this time, the gain modulation part 24 subtracts the S/N improvement amount S23 from the sensor gain value S2. Then, the gain modulation part 24 outputs the modulated sensor gain value S24 to the development parameter setting part 3.

The development parameter setting part 3 uses the modulated sensor gain value S24 to output the development parameter S4 obtained by interpolating from the development parameter storage part 4 similarly to the general raw development process. Next, the development parameter setting part 3 sets the development parameter S4 in the raw development processing part 5.

The raw data processing apparatus 21, which applies the S/N improvement amount table 23 when resizing the image of the raw data, resizes the image through an interpolation filter. Therefore, the raw data S22 has the S/N improved due to a filter effect after resizing the image. Here, there is no problem if the developed image data is resized, but, in a case where the image of the raw data is resized, deviation occurs in a correspondence relation between the sensor gain value S2 and the S/N, making the optimum development difficult.

The reduction process using the raw data advantageously decreases an image data size. Therefore, for example, when a process is performed using a frame memory such as a DRAM during the development, a bandwidth of a bus may be decreased or the frame memory usage may be decreased. Disadvantageously, since a deviation occurs between information of the sensor gain value S2 and an actual S/N, parameters used for the reduction process may need to be set aside from the development parameters for the still image, increasing a storage capacity of the development parameter storage part 4.

However, the raw data processing apparatus 21 may need only the S/N improvement amount table 23 separately provided, but the parameters used for resizing the image of the raw data may not need to be held newly, improving the disadvantage in resizing the image.

The gain modulation part 24 described above according to the second embodiment extracts the S/N improvement amount S23 on the basis of the sensor gain value S2 and the resizing ratio S21. Subsequently, the gain modulation part 24 outputs the sensor gain value S24 obtained by modulating the sensor gain value S2 using the S/N improvement amount S23 to the development parameter setting part 3. Here, the S/N improvement amount table 23 defines in advance the S/N improvement amount S23 as the table value found from the resizing ratio S21 and the sensor gain value S2. The gain modulation part 24 may quickly extract the S/N improvement amount S23 to modulate the sensor gain value S2 into the sensor gain value S24. Therefore, even if there are various combinations of the resizing ratio S21 and the sensor gain value S2, the optimum S/N improvement amount S23 can be extracted to improve the S/N of the sensor gain value S2. Additionally, the optimum development parameter S4 is set from the modulated sensor gain value S24 on the basis of the development parameter S3 read out the development parameter storage part 4. For this reason, the raw development processing part 5 can carry out the optimum development of the resized raw data S22.

<4. Third Embodiment>
[Example in which a Sensor Gain Value is Modulated Depending on a Three-Dimensional Noise Reduction Intensity]

Next, a structure example and operation example of an imaging device 30 according to a third embodiment of the present disclosure are described with reference to FIG. 5 and FIG. 6.

Figures 5, 6:
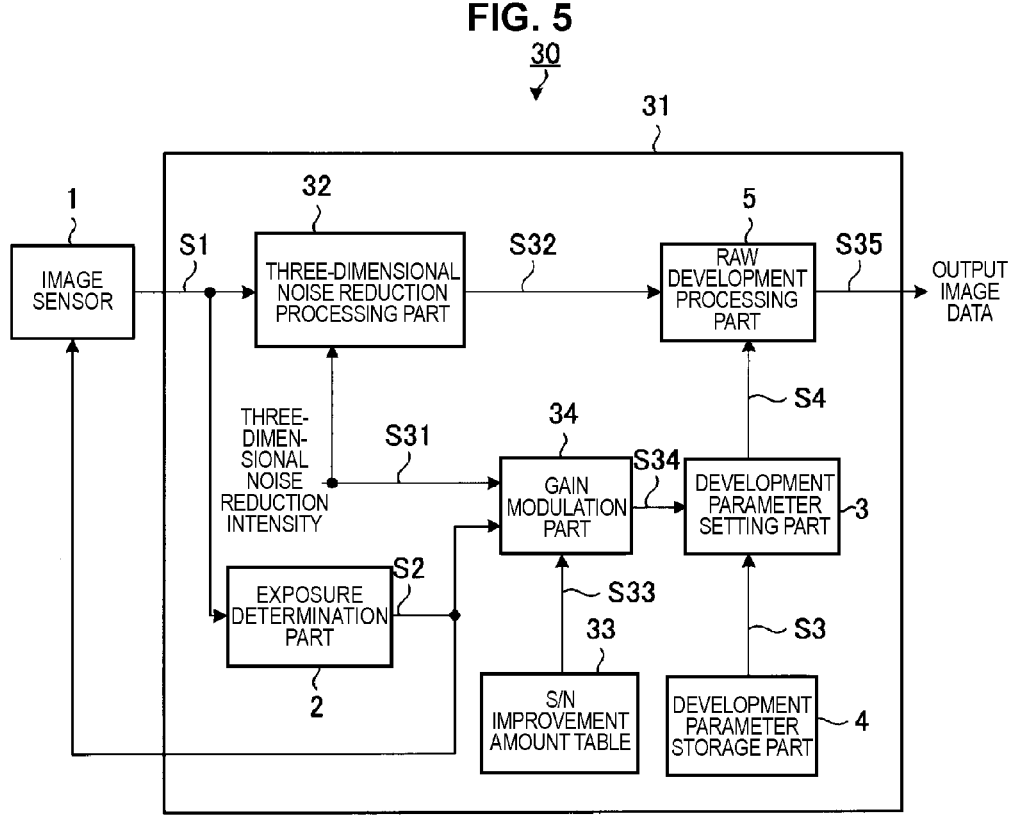
FIG. 5 is a block diagram showing an internal structure example of an imaging device according to a third embodiment of the present disclosure.
FIG. 6 is an illustration showing a structure example of an S/N improvement amount table for defining an S/N improvement amount on the basis of a three-dimensional noise reduction intensity and a sensor gain value according to the third embodiment of the present disclosure.

FIG. 5 shows an internal structure example of the imaging device 30 according to the third embodiment.

The imaging device 30 according to the third embodiment includes the image sensor 1 and a raw data processing apparatus 31. The raw data processing apparatus 31 includes processing blocks below besides the exposure determination part 2, development parameter setting part 3, development parameter storage part 4, and raw development processing part 5 which are included in the imaging device 100. That is, the raw data processing apparatus 31 includes a three-dimensional noise reduction processing part 32, an S/N improvement amount table 33, and a gain modulation part 34.

The raw data processing apparatus 31 subjects the raw data output from the image sensor 1 to a three-dimensional noise reduction process in the three-dimensional noise reduction processing part 32. The three-dimensional noise reduction process is a process in which an image having two or more sequential frames shot is averaged in a pixel unit and the noise is removed from the raw data S1. The three-dimensional noise reduction processing part 32 and the gain modulation part 34 are supplied with a three-dimensional noise reduction intensity S31 by the CPU not shown.

The three-dimensional noise reduction processing part 32 is used as an example of a variable processing part which processes the raw data with a predetermined variable value. The three-dimensional noise reduction processing part 32 performs the three-dimensional noise reduction process on the raw data on the basis of the supplied three-dimensional noise reduction intensity and outputs raw data S32 to the raw development processing part 5. The raw development processing part 5 develops the raw data S32, generates a moving image data S35, and outputs the image data to a later stage processing block.

The development parameter S4 applied to the raw data S32 by the raw development processing part 5 is supplied from the development parameter setting part 3 similarly to the general raw development process. The development parameter setting part 3 refers to a sensor gain value S34 modulated by the gain modulation part 34. The gain modulation part 34 extracts an S/N improvement amount S33 for the sensor gain value S2 from the S/N improvement amount table 33 and finds the sensor gain value S34 by subtracting the S/N improvement amount S33 from the sensor gain value S2.

FIG. 6 is an illustration showing a structure example of the S/N improvement amount table 33 for defining the S/N improvement amount S33 on the basis of the three-dimensional noise reduction intensity S31 and the sensor gain value S2.

The S/N improvement amount table 33 includes an axis classified in accordance with the gain value of the image sensor 1 and an axis classified in accordance with the three-dimensional noise reduction intensity, and has the S/N improvement amount S33 provided as a table value in each intersection of the axes in advance by the CPU and the like. Then, the S/N improvement amount S33 is extracted using both the three-dimensional noise reduction intensity S31 for the raw data and the sensor gain value S2 in the S/N improvement amount table 33.

As described above, the three-dimensional noise reduction intensity and the sensor gain value S2 output from the exposure determination part 2 are input to the gain modulation part 34. The gain modulation part 34 refers to the S/N improvement amount table 33 using these two values to extract the S/N improvement amount S33.

The gain modulation part 34 modulates the sensor gain value S2 by use of the S/N improvement amount S33 extracted from the S/N improvement amount table 33 on the basis of the three-dimensional noise reduction intensity and the sensor gain value S2 of the image sensor 1. At this time, the gain modulation part 34 subtracts the S/N improvement amount S33 from the sensor gain value S2. Then, the gain modulation part 34 outputs the modulated sensor gain value S34 to the development parameter setting part 3.

The development parameter setting part 3 uses the modulated sensor gain value S34 to output the development parameter S4 obtained by interpolating from the development parameter storage part 4 similarly to the general raw development process. Next, the development parameter setting part 3 sets the development parameter S4 in the raw development processing part 5.

The gain modulation part 34 described above according to the third embodiment extracts the S/N improvement amount S33 on the basis of the sensor gain value S2 and the three-dimensional noise reduction intensity when performing the raw development process on the raw data S32 having been subjected to the three-dimensional noise reduction process. Subsequently, the gain modulation part 34 outputs the sensor gain value S34 obtained by improving the sensor gain value S2 using the S/N improvement amount S33 to the development parameter setting part 3. Since the S/N improvement amount table 33 defines in advance the S/N improvement amount S33 as the table value found from the three-dimensional noise reduction intensity and the sensor gain value S2, the gain modulation part 34 may quickly extract the S/N improvement amount S33 to modulate the sensor gain value S2 into the sensor gain value S34. Therefore, even if there are various combinations of the three-dimensional noise reduction intensity S31 and the sensor gain value S2, the optimum S/N improvement amount S33 can be extracted to improve the S/N of the sensor gain value S2. Additionally, the optimum development parameter S4 is set from the modulated sensor gain value S34 on the basis of the development parameter S3 read out the development parameter storage part 4. For this reason, the raw development processing part 5 can carry out the optimum development of the raw data S32 having been subjected to the three-dimensional noise reduction process.

In addition, when the imaging device 30 performs the three-dimensional noise reduction process on the raw data, the S/N of the raw data is improved due to an NR effect. Therefore, similar to the resizing process for the raw data, parameters used for the three-dimensional noise reduction process may need to be set aside from the development parameters for the still image, increasing a storage capacity of the development parameter storage part 4. However, by providing the S/N improvement amount table 33 in advance, it may not be necessary to increase the storage capacity of the development parameter storage part 4.

<5. Modified Embodiment>

The gain modulation parts described above according to the first to third embodiments subtract the S/N improvement amount from the sensor gain value S2 to modulate the sensor gain value S2. However, the sensor gain value S2 may be modulated by use of a combination of addition, subtraction, multiplication and division.

Further, the structures and processes of the imaging device according to the first to third embodiments may be arbitrarily combined.

Note that the series of operations in the foregoing embodiments may be executed in hardware, and may also be executed in software. In the case of executing the series of operations in software, a program constituting such software may be executed by a computer built into special-purpose hardware, or alternatively, by a computer onto which programs for executing various functions are installed. For example, a program constituting the desired software may be installed and executed on a general-purpose personal computer.

Also, a recording medium storing program code of software that realizes the functionality of the foregoing embodiments may also be supplied to a system or apparatus. It is furthermore obvious that the functionality is realized by a computer (or CPU or other control apparatus) in such a system or apparatus retrieving and executing the program code stored in the recording medium.

The recording medium used to supply program code in this case may be a flexible disk, hard disk, optical disc, magneto-optical disc, CD-ROM, CD-R, magnetic tape, non-volatile memory card, or ROM, for example.

Also, the functionality of the foregoing embodiments may realized by a computer executing retrieved program code. In addition, some or all of the actual operations may be conducted on the basis of instructions from such program code by an OS or other software running on the computer. This also encompasses cases where the functionality of the foregoing embodiments is realized by such operations.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A raw data processing apparatus including:
a variable processing part that processes raw data with a predetermined variable value, the raw data being output from an imaging element based on image light incident via an optical system;
an exposure determination part that receives the raw data from the imaging element, determines an exposure which is set when raw data is shot, and determines a gain value of the imaging element;
an improvement amount table in which an improvement amount for the gain value of the imaging element is set;
a gain modulation part that extracts the improvement amount from the improvement amount table based on information of the raw data processed with a predetermined variable value and the determined gain value of the imaging element, and modulates the gain value of the imaging element;
a development parameter setting part that sets a development parameter used for developing the raw data based on the modulated gain value of the imaging element; and
a development processing part that outputs image data which is developed from the raw data based on the set development parameter.

(2) An imaging device according to (1), wherein
the variable processing part is a raw data combining part that combines a plurality of pieces of the raw data sequentially input from the imaging element,
the improvement amount table includes an axis classified in accordance with the gain value of the imaging element and an axis classified in accordance with a number of combined pieces of the raw data, and has the improvement amount provided in each intersection of the axes, and
the gain modulation part modulates the gain value of the imaging element using the improvement amount extracted from the improvement amount table based on the number of combined pieces of the raw data and the gain value of the imaging element.

(3) The imaging device according to (1) or (2), wherein
the variable processing part is further a resizing processing part that performs a resizing process on an image of the raw data based on a resizing ratio,
the improvement amount table includes an axis classified in accordance with the gain value of the imaging element and an axis classified in accordance with the resizing ratio, and has the improvement amount provided in each intersection of the axes, and
the gain modulation part modulates the gain value of the imaging element using the improvement amount extracted from the improvement amount table based on the resizing ratio and the gain value of the imaging element.

(4) An imaging device according to any one of (1) to (3), wherein
the variable processing part is further a three-dimensional noise reduction processing part that performs a three-dimensional noise reduction process on the raw data based on a three-dimensional noise reduction intensity, the improvement amount table includes an axis classified in accordance with the gain value of the imaging element and an axis classified in accordance with the three-dimensional noise reduction intensity, and has the improvement amount provided in each intersection of the axes, and the gain modulation part modulates the gain value of the imaging element using the improvement amount extracted from the improvement amount table based on the three-dimensional noise reduction intensity and the gain value of the imaging element.

(5) A raw data processing method including:

processing raw data with a predetermined variable value, the raw data being output from an imaging element based on image light incident via an optical system;

receiving the raw data from the imaging element, determining an exposure which is set when raw data is shot, and determining a gain value of the imaging element;

extracting an improvement amount from an improvement amount table in which the improvement amount for the gain value of the imaging element is set based on information of the raw data processed with a predetermined variable value and the determined gain value of the imaging element, and modulating the gain value of the imaging element;

setting a development parameter used for developing the raw data based on the modulated gain value of the imaging element; and outputting image data which is developed from the raw data based on the set development parameter.

(6) An imaging device including:

an imaging element that outputs raw data based on image light incident via an optical system;

a variable processing part that processes the raw data with a predetermined variable value;

an exposure determination part that receives the raw data from the imaging element, determines an exposure which is set when raw data is shot, and determines a gain value of the imaging element;

an improvement amount table in which an improvement amount for the gain value of the imaging element is set;

a gain modulation part that extracts the improvement amount from the improvement amount table based on information of the raw data processed with a predetermined variable value and the determined gain value of the imaging element, and modulates the gain value of the imaging element;

a development parameter setting part that sets a development parameter used for developing the raw data based on the modulated gain value of the imaging element; and a development processing part that outputs image data which is developed from the raw data based on the set development parameter.

The present disclosure contains subject matter related to that disclosed in Japanese Priority Patent Application JP 2012-185087 filed in the Japan Patent Office on Aug. 24, 2012, the entire content of which is hereby incorporated by reference.

What is claimed is:

1. A raw data processing apparatus comprising:

one or more processors;

a variable processing block that processes raw data using a predetermined variable value that affects a signal to noise ratio of the raw data, the raw data being image data output from an imaging element, the predetermined variable value supplied by the one or more processors;

an exposure determination block that also receives the raw data from the imaging element and determines a determined gain value of the imaging element based on a determination result obtained by determining an exposure which is set when the raw data is shot;

storage including an improvement amount table comprised of improvement amounts for the determined gain value of the imaging element correlated to imaging element gain values and different variable values;

a gain modulation block that extracts one of the improvement amounts from the improvement amount table based on the predetermined variable value and the determined gain value of the imaging element, and generates a modulated gain value for the imaging element;

a development parameter setting block that sets a development parameter used for developing the raw data based on the modulated gain value for the imaging element; and a development processing block that outputs image data which is developed from the raw data processed with a predetermined variable value based on the set development parameter, wherein, each of the blocks is executed by the one or more processors.

2. The raw data processing apparatus according to claim 1, wherein:

the different predetermined variable values are numbers of combined pieces of raw data, the predetermined variable value is one of the numbers of combined pieces of raw data, the variable processing block is a raw data combining block that combines a plurality of pieces of the raw data sequentially received from the imaging element equal in number to the one of the numbers of combined pieces of raw data, the improvement amount table includes an axis classified in accordance with gain values for the imaging element and an axis classified in accordance with the number of combined pieces of the raw data, and each intersection of the axes is correlated to one of the improvement amounts, and the gain modulation block modulates the gain value of the imaging element using the improvement amount extracted from the improvement amount table based on the number of combined pieces of the raw data and the determined gain value of the imaging element.

3. The raw data processing apparatus according to claim 1, wherein:

the different variable values are resizing ratios, the predetermined variable value is one of the resizing ratios, the variable processing block performs a resizing process on an image of the raw data based on the one of the resizing ratios, the improvement amount table includes an axis classified in accordance with gain values for the imaging element and an axis classified in accordance with resizing ratios, and each intersection of the axes is correlated to one of the improvement amounts, and the gain modulation block modulates the gain value of the imaging element using the improvement amount extracted from the improvement amount table based on the resizing ratio and the determined gain value of the imaging element.

4. The raw data processing apparatus according to claim 1, wherein;

the different variable values are three-dimensional noise reduction intensities, the predetermined variable value is one of the three-dimensional reduction intensities, the variable processing part performs a three-dimensional noise reduction process on the raw data based on the one of the three-dimensional noise reduction intensities, the improvement amount table includes an axis classified in accordance with gain values for the imaging element and an axis classified in accordance with three-dimensional noise reduction intensities, and each intersection of the axes is correlated to one of the improvement amounts, and the gain modulation block modulates the gain value of the imaging element using the improvement amount extracted from the improvement amount table based on the three-dimensional noise reduction intensity and the determined gain value of the imaging element.

5. A raw data processing method comprising:

processing raw data with a predetermined variable value, the raw data being image data output from an imaging element;

receiving the raw data from the imaging element and determining a determined gain value of the imaging element based on a determination result obtained by determining an exposure which is set when the raw data is shot;

providing an improvement amount table comprised of improvement amounts for the determined gain value of the imaging element correlated to imaging element gain values and different variable values;

extracting an improvement amount from the improvement amount table using the predetermined variable value and the determined imaging element gain value;

generating a modulated gain value for the imaging element based on the predetermined variable value and the extracted improvement amount;

setting a development parameter used for developing the raw data based on the modulated gain value for the imaging element; and outputting image data which is developed from the raw data processed with a predetermined variable value based on the set development parameter.

6. An imaging device comprising:

an imaging element that outputs raw data based on image light incident via an optical system, the raw data being image data;

one or more processors;

a variable processing block that processes the raw data using a predetermined variable value that affects a signal to noise ratio of the raw data, the predetermined variable value supplied by the one or more processors;

an exposure determination block that also receives the raw data from the imaging element and determines a determined gain value of the imaging element based on a determination result obtained by determining an exposure which is set when the raw data is shot;

storage including an improvement amount table comprised of improvement amounts for the determined gain value of the imaging element correlated to imaging element gain values and different variable values;

a gain modulation block that extracts one of the improvement amounts from the improvement amount table based on the predetermined variable value and the determined gain value of the imaging element, and generates a modulated gain value for the imaging element;

a development parameter setting block that sets a development parameter used for developing the raw data based on the modulated gain value for the imaging element; and a development processing block that outputs image data which is developed from the raw data processed with a predetermined variable value based on the set development parameter, wherein, each of the blocks is executed by the one or more processors.

* * * * *